United States Patent [19]
Whitaker

[11] 3,749,456
[45] July 31, 1973

[54] FLUID LUBRICATED BEARING AND PRESSURE SENSING CONTROL VALVE

[76] Inventor: William D. Whitaker, 1512 E. 5th, No. 30, Ontario, Calif. 91762

[22] Filed: Nov. 20, 1970

[21] Appl. No.: 91,278

Related U.S. Application Data

[63] Continuation-in-part of Ser. No. 754,112, Aug. 15, 1968, abandoned, which is a continuation of Ser. No. 558,748, June 20, 1966, abandoned.

[52] U.S. Cl. .................................................. 308/9
[51] Int. Cl. ........................................ F16c 17/16
[58] Field of Search ............................... 308/9, 122

[56] References Cited
UNITED STATES PATENTS
3,113,808  3/1961  Carnol .............................. 308/722

*Primary Examiner*—Milton Kaufman
*Assistant Examiner*—Frank Susko
*Attorney*—Lyon & Lyon

[57] ABSTRACT

A fluid lubricated bearing having a set of fluid receiving bearing cavities, each being in communication with a control valve which senses incipient positive or negative pressure change due to incipient movement of the shaft toward or away from the cavity, then amplifies the sensed change and feeds lubricating fluid to the corresponding bearing cavity at the pressure and rate needed to create a restoring force sufficient to minimize or prevent shaft displacement. The valve also being adapted to the control of fluid motors to detect incipient change in load, then responding by supplying more or less motor fluid as required.

12 Claims, 32 Drawing Figures

INVENTOR.
WILLIAM D. WHITAKER
BY
Lyon+Lyon
ATTORNEYS

INVENTOR.
WILLIAM D. WHITAKER
BY
Lyon+Lyon
ATTORNEYS

INVENTOR.
WILLIAM D. WHITAKER
BY
Lyon & Lyon
ATTORNEYS

INVENTOR.
WILLIAM D. WHITAKER
BY
Lyon & Lyon
ATTORNEYS

Fig. 32

FLUID LUBRICATED BEARING AND PRESSURE SENSING CONTROL VALVE

This application is a continuation-in-part of a previously filed application, Ser. No. 754,112, filed Aug. 15, 1968 now abandoned, which, in turn, is a continuation of application Ser. No. 558,748, filed June 20, 1966, now abandoned.

BACKGROUND OF THE INVENTION

Fluid lubricated bearings utilize fluid ranging from a high density viscous fluid to gaseous fluids. The bearing may be conical, cylindrical, flat, spherical or other desired shape, and intended for radial or thrust loads or a combination of the two. Friction losses increase with velocity; hence, as the required shaft speed increases, the viscosity of the lubricating fluid must be reduced to avoid excessive heating, or means be provided to circulate and cool the lubricating fluid.

It is essential that a film of lubricant be maintained between the bearing and its shaft; otherwise, the bearing will fail. The problem of maintaining a film increases with decreased viscosity. The problem of film continuity is compounded by the fact that the shaft seldom runs completely true; that is, the shaft may precess or whirl about the center of gravity of the rotating mass, the gravitational load imposed on the shaft may cause the shaft to displace from the center of the bearing. These displacement forces are resisted by the lubricant film. As the viscosity decreases, the resistance of the lubricant film to the displacement forces decreases, but is compensated in part by increased lubricant pressure. If the lubricant is gaseous or compressible, a spring effect is added, which may also produce vibration, the frequency of which is influenced by several factors.

Various partial solutions to the problems indicated have been found, principally by use of more viscous fluids, circulation of the fluids at high pressure, and external cooling of the fluids. In many cases, it would be preferred to use fluids of low viscosity including gaseous fluids such as air, but the load and velocity requirements often prohibit use of such lubricants.

Should it be possible to sense at different locations within the area of the bearing, the need of additional lubricant and then supply the additional lubricant, or the need of less lubricant and then reduce the supply, the viscosity of the fluid could be reduced to the point that air may be used in many cases where a viscous liquid lubricant is now required.

Also, in the operation of various fluid motors, especially, but not limited to air driven motors, it would be desirable that means be provided which would sense the load demand and compensate by providing additional or less motive fluid as required.

BACKGROUND OF THE INVENTION AS IT PERTAINS TO FLUID BEARINGS

In 1883 Petroff proposed an equation for the friction horse power loss in a journal type bearing having near constant film thickness, which shows that the friction horse power loss decreases as the viscosity of the fluid decreases and as the film thickness increases. This equation also shows that larger bearings and higher speed bearings have higher friction horsepower losses as follows:

$$FHP = \frac{VLD^3 \left(\frac{N}{1000}\right)^2}{5,280,000 \, T}$$

with $FHP$ = Friction Horsepower
$V$ = Viscosity, In Centipoise
$L$ = Bearing Length, In inches
$D$ = Bearing Diameter, In Inches
$N$ = Speed, in RPM
$T$ = Film Thickness, In Inches At atmospheric pressure and 150° F., the ratio of air viscosity to water viscosity is:

$$V(AIR)/V(WATER) = 0.020/0.43 = 1/21.5$$

and the ratio of air viscosity to S.A.E. 10 oil viscosity is:

$$V(AIR)/V(S.A.E. \, 10 \, OIL) = 0.020/10 = 1/500$$

and the ratio of S.A.E. 10 oil at 150° F. to S.A.E. oil at 70° F. is:
$V(S.A.E. \, 10 \, OIL \, AT \, 150° \, F)/V(S.A.E. \, 10 \, OIL \, AT \, 70° \, F) = 10/70 = 1/7$ and the ratio of air viscosity at 32° F. to air viscosity at 150° F. is:
$V(AIR \, AT \, 32° \, F)/V(AIR \, AT \, 150° \, F) = 0.0171/0.0201 = 1/1.175$ The bearings total load capacity or lift force is the resultant force of the fluid film pressure forces acting on the shaft as follows:

$$F_T = F_S + F_{DL}$$

with
$F_T$ = Bearings Total Load Capacity, In Lbs.
$F_{DL}$ = Dynamic Lift Forces Including The Dashpot Damping Force, In Lbs.
$F_S$ = Supply Pressure Lift Force, In Lbs.

The bearings total load is the resultant force of the forces acting on the bearing as follows:

$$L_T = S_W + S_C + S_G + S_L$$

with
$L_T$ = Total Load, In Lbs.
$S_W$ = Shaft Weight, In Lbs.
$S_C$ = Shaft Centrifugal Load, In Lbs.
$S_G$ = Shaft Gyrosopic Load, In Lbs.
$S_L$ = Load Applied To The Shaft, In Lbs.

The natural frequency of vibration of the shaft weight supported on the bearings fluid film is:

$$f = 1/2 \, \pi \, KG(/) \, W^{.5}$$

with
$f$ = The Natural Frequency, In CPS
$K$ = The Film Spring Rate, In Lbs./Inch of Deflection
$K = F/D$ = Force/Deflection
$G$ = The Gravitational Constant, In Inches/SEC$^2$
$W$ = Shaft Weight, In Lbs.

If the fluid springs are compressed with a force acting on the shaft and released the shaft tends to vibrate at its natural frequency of vibration until the stored up energy is absorbed in damping as follows:
ENERGY $= E = FD/2 = \frac{1}{2}(W/G) \, V^2$, $V^2 =$ $$\left(\frac{FD}{2} \frac{2}{1} \frac{G}{W}\right), V = \text{VELOCITY},$$

$V^2/D = (FG,/W)(F/D) = K, (V^2/D^2) = (FG/DW) = (KG,/W)$ $V/D = (KG/W)^{.5}, f2D\pi = V, \dfrac{f2D\pi}{D} = (KG/W)^{.5}$, $$f = 1/2\pi \, (KG/W)^{.5}$$

The spring rate or stiffness is increased by reducing the fluid film spring deflection with respect to the rotor weight as follows:

$$K = F/D = W/D, D \to O, \text{ and } K \to \infty$$

The centrifugal force created by the rotation of the center of gravity around the shaft center or around the center of the bearing is equal to the lift force of the supporting fluid film spring at the natural frequency of vibration of the shaft on the fluid springs as follows:

$$f = \tfrac{1}{2}\pi (KG/w)^{.5}, f = \tfrac{1}{2}\pi[(F/D)(G/W)]^{.5}, (2\pi f)^2 = FG/DW$$

$$F = W/G (2\pi f)^2 D = KD$$

Therefore, the orbit of the center of gravity of the shaft around the center of rotation tends to increase at a rotational frequency equal to the natural frequency of vibration of the shaft on its supporting fluid flim.

$D = $ The Radius Of The Orbit Of The Shafts Center Of Gravity Around The Center Of Rotation Of A Balanced Shaft.

In an actual rotor the C.G. is displaced a distance x from the center of the shaft and the center of the shaft is displaced a distance y from the center of rotation, then the centrifugal force is:

$$F = W/G (2\pi f)^2 (y+x)$$

That is below the natural frequency of vibration and the spring force is:

$$F = KD, \text{ since } K = F/D$$

Equating forces:

$$KD = W/G (2\pi f)^2 (y+x)$$

Then above the natural frequency of vibration due to shaft rotation around the center of gravity:

$$KD = W/G (2\pi f)^2 (y - x)$$

The orbit of the shafts center of gravity also increases at rotational frequencies 2,3,4,6, etc. times the natural frequency of vibration. These are called harmonic frequencies in physics.

Figure 12:
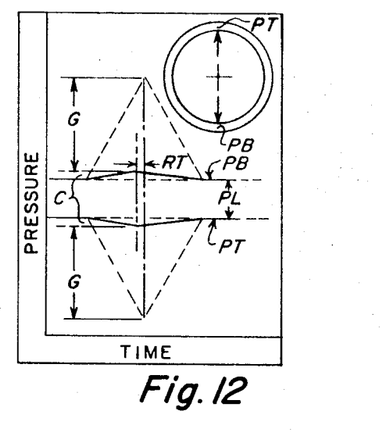
FIG. 12 is a diagram, indicating the relationship of the pressure sensed by the control valve and the gain in pressure as supplied to the bearing or other device associated with the control valve.
Figures 16, 18:
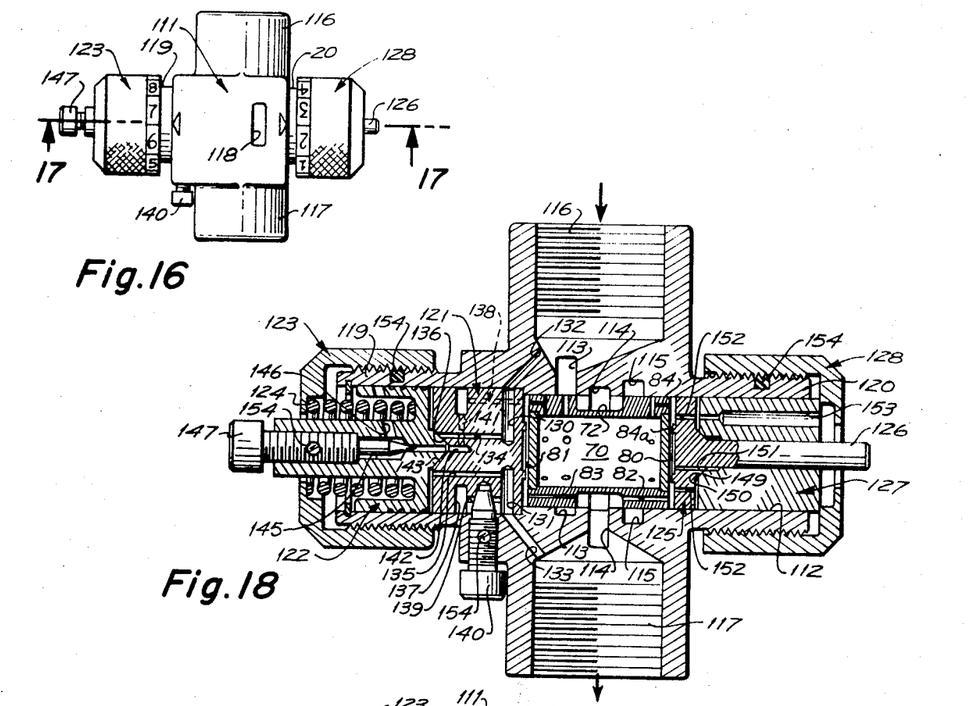

An objective of the pressure sensing fluid flow control is to amplify a small change in the fluid lubricating film pressure to increase the stiffness of the low viscosity fluid film. Referring to FIG. 12, the fluid lubricating bearing film pressure vs. time diagram which shows a small change in film pressure being amplified according to the following amplification ratio equation, $A_R$, for a gas fluid and $A'_R$ for a liquid fluid.

$$A_R = \frac{P'_2 - P_2 \left(\frac{A_E}{A_E - A_C}\right)}{P_2 \left(\frac{A_E}{A_E - A_C}\right) - P_2} = \frac{G}{C}$$

$$= \frac{\text{Gain in pressure}}{\text{Small change in pressure}}$$

with $p'_2 = $ Amplified $P_2$, In PSIA
$P_2 = $ Film Pressure, In PSIA
$A_E = $ Film Exit Area, In Square Inches
$A_C = $ Small Change In Film Exit Area, In Square Inches Then for $A'_R$ the same equation applies using $(A_E/A_E - A_C)^2$ instead of $(A_E/A_E -' A_C)$, with $p_2$ and $P'_2$ in PSI. These equations also apply to the pressure sensing fluid flow control shown in FIG. 18 by substituting the measured exit area from the control and the change in exit area from the control required to amplify the fluid pressure.

The flow of a gas through a thin plate orifice per Reynolds (Trans. ASME, 1916, P. 799) was found to be:

$$W_A = 0.425 D^2 (P_1^2 - P_2^2)^{.48} / T_1^{.5}$$

with $W_A = $ Flow, Lb. Per Sec.
$D = $ Orifice Dia., Inches
$P_1 = $ Inlet Pressure, PSIA.
$P_2 = $ Discharge Pressure, PSIA.
$T_1 = $ Inlet Temperature, Deg. R.

for $P_2 / P_1 = 1$ to $0.13$

The flow of a liquid through a sharp edge orifice is found to be:

$$Q = 0.61 \pi D^2 / 4 (2 G H)^{.5}$$

with $Q = $ Flow, CFS.
$D = $ Orif. Dia., FT.
$H = $ Head, FT.
$G = $ Gravity Accel., F/S/S.

The flow of a liquid through a capillary tube per Poiseville in 1842 was found to be:

$H/L = 28.3 (M/S)(Q/D^4)$ with $H = $ Head Loss, FT.
$L = $ Length, FT.
$Q = $ Flow, Cu. FT. / SEC.
$M = $ Viscosity, Poises.
$S = $ Specific WT., Grams/CC.
$D = $ Dia., Inches.

The flow of a gas through a capillary tube is found by combining the above gas flow EQ. for an ORIF. with the above liquid flow EQ. for a capillary tube into the following practical equation:

$$W_A = 0.424 (P_1^2 - P_1^2)^{.48} (S/M)(D^4/l)$$

with $W_A = $ Flow, Lbs/SEC.
$L = $ Length, Inches.
$P_1 = $ Inlet Pressure, PSIA.
$P_2 = $ Discharge Pressure, PSIA.
$M = $ Viscosity, Poises.
$S = $ Specific Wt., Grams/CC.

NOTE: Use the Orif. Flow EQ. up to $L = 3D$, due to the contraction of the jet aft of the tube inlet.

The flow of a liquid through a thin slot per Fuller was found with the following equation:

$$Q = (P_1 - P_2) B T^3 / 12 M L$$

with $Q = $ Flow, CU. IN./SEC.
$P_1 = $ Inlet Pressure, PSI.
$P_2 = $ Discharge Pressure, PSI.
$B = $ Breadth, Inches
$T = $ Thickness, Inches
$M = $ Viscosity, Lb. SEC./IN$^2$
$L = $ Length, Inches The flow of a gas through a thin slot is found by substituting kinematic viscosity for $M$ and $(P_1^2 - P_2^2)^{.48}$ for $(P_1 6 - P_2)$ in Fuller's equation for the flow through a thin slot as follows:

$$W_A = 839 (P_1^2 - P_2^2)^{.48} B T^3 (S/M) / l$$

with $W_A = $ Flow, Lbs/SEC.
$P_1 = $ Inlet Pressure, PSIA.
$P_2 = $ Discharge Pressure, PSIA.

B = Breadth, Inches
T = Thickness, Inches
M = Viscosity, Poises
S = Specific Wt., Grams/CC.

Dashpot damping is proportional to velocity which is proportional to frequency as shown in the following equation:

$$f = V/\pi A$$

with
V = Max. Velocity, Inches Per SEC.
f = Frequency, Cycles Per SEC.
A = Amplitude, Inches.

SUMMARY OF THE INVENTION

The present invention is directed to a fluid lubricated bearing and pressure sensing control valve which is summarized in the following objects:

First, to provide a fluid lubricated bearing and novelly arranged pressure sensing control valve wherein the bearing is provided with a set of lubricating pressure fluid receiving bearing cavities, each in communication with a corresponding control valve which incorporates a novel means of sensing incipient positive or negative pressure change in its corresponding bearing cavity caused by incipient displacement of the shaft to or from the bearing cavity, then amplifying the sensed change and increasing or decreasing the lubricant fluid supply to the corresponding bearing cavity so as to apply a restoring force sufficient to prevent or minimize shaft displacement.

Second, to provide a control valve, as indicated in the preceding object, which is capable of extremely rapid response to compensate for transient shaft displacement forces as well as more permanently or consistently applied forces.

Third, to provide a fluid lubricated bearing and control valve, as indicated in the preceding objects, which permits the use of low viscosity lubricants under greater load conditions than has heretofore been considered possible; more particularly, while not limited to gaseous lubricants, permits the use of air to attain high shaft speeds with increased loads while assuring that the proper lubricant film is maintained even during starting and stopping conditions.

Fourth, to provide a pressure sensing control valve which is not limited for use in the control of bearing fluid pressures, but is adapted for use wherever it is desired to sense incipient fluid pressure change and respond by increasing or decreasing the fluid supply to augment the change.

Fifth, to provide a pressure sensing control valve having an incipient pressure change sensing means, as indicated in the preceding object, which may be adapted for the control of a fluid motor; for example, a fluid motor intended to drive a drill or other tool. In such case, incipient increased or decreased load on the motor due to change in load on the tool causes the sensing means to respond by supplying an appropriately amplified increased or decreased quantity of motive fluid to compensate for the change in load.

Sixth, to provide a pressure sensing control valve, as indicated in the preceding object, which incorporates a novel manually operated means for overriding the sensing means whereby the valve may be caused to operate at full volume or a predetermined maximum volume irrespective of its sensing means.

Seventh, to provide a pressure sensing control valve which, with minor changes in the porting, is adaptable to a wide range of applications.

DESCRIPTION OF THE DRAWINGS

FIG. 1 is a fragmentary sectional view, with portions in elevation, of a conical fluid lubricated bearing having a set of pressure sensing control valves.

2 is a fragmentary transverse sectional view, taken through 2—2 of FIG. 1.

FIG. 16 is an elevational view of a pressure sensing control valve, adapted for the operation of fluid motors or the like.

FIG. 18 is a longitudinal sectional view, taken through 18—18 of FIG. 17.

Reference is first directed to FIGS. 1 through 5. The construction here illustrated is a fluid lubricated bearing and pressure sensing control valve which is intended primarily to utilize air as the lubricant, but may, if desired, employ a low viscosity liquid. A shaft 1 is provided, having a conical journal 2 surrounded by a bearing body 3 which, in turn, is contained in a housing structure 4. The bearing body 3 is provided with a conical bearing surface conforming to the journal 2.

Figures 1, 2:
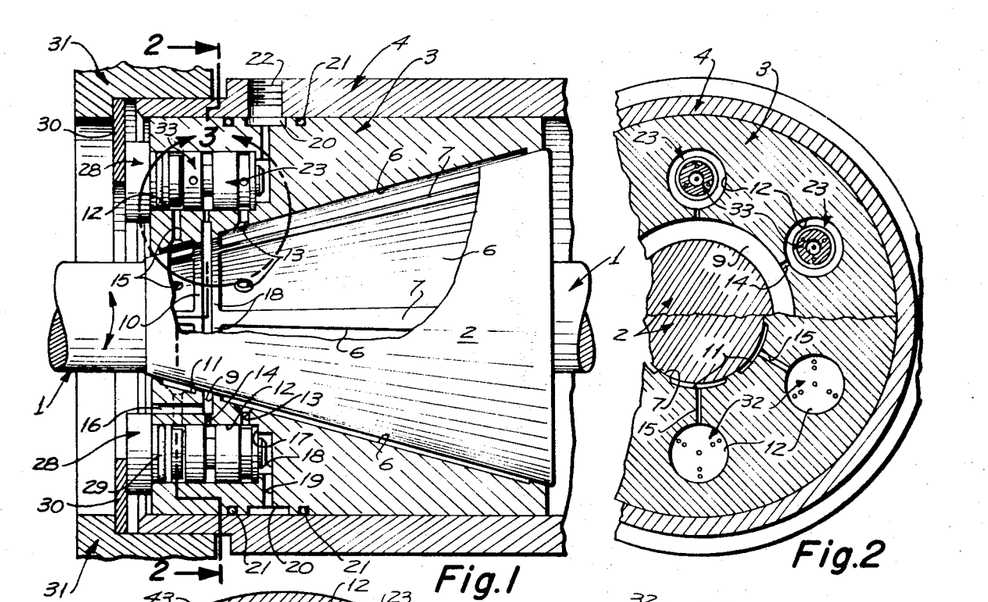
Figure 3:
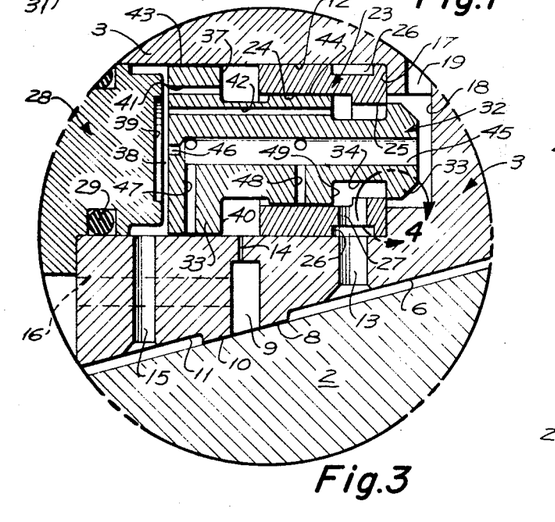
FIG. 3 is an enlarged fragmentary sectional view, taken within Circle 3 of FIG. 1, showing particularly one of the pressure sensing control valves.
Figure 4:
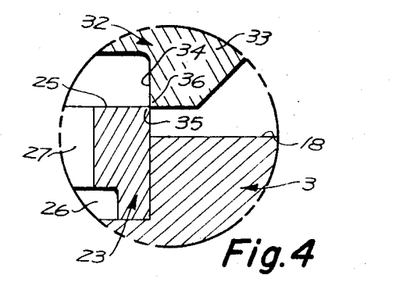
FIG. 4 is a further enlarged fragmentary sectional view, taken within Circle 4 of FIG. 3, showing particularly the sensing valve inlet port in its closed or minimum flow condition.
Figure 5:
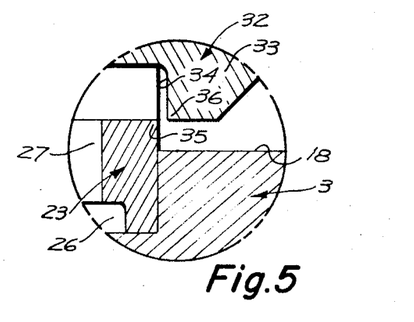
FIG. 5 is a fragmentary sectional view, corresponding to FIG. 4, but showing the inlet port in its open condition.

Formed in the bearing surface is a set of bearing lubricant cavities 6, separated by webs 7. The cavities 6 occupy the major portion of the bearing surface. The cavities 6 terminate a short distance from the smaller end of the bearing surface and are separated by a circular web 8 from an annular vent cavity 9. The vent cavity, in turn, is separated by an annular web 10 from a set of pressure sensing cavities 11, corresponding in number and position to the lubricant cavities 6.

Disposed in the bearing body 3, radially outward from each lubricant cavity 6 and its pressure sensing cavity 11, is an axially directed sensing valve bore 12. Each sensing valve bore is provided with a port 13 communicating with a corresponding bearing fluid cavity, a constricted port 14 communicating with the vent cavity 9 and a port 15 communicating with the corresponding sensing cavity 11. The vent cavity 9 is provided with one or more vent ports 16, exposed to the adjacent axial end of the bearing body 3.

Each sensing valve bore 12 is provided near its inner end with a shoulder 17, beyond which is an inlet cavity 18, intersected by a radially extending inlet passage 19. The inlet passages 19 are supplied from a common annular inelt manifold channel 20, surrounding the bearing body 3 and flanked by seal rings 21. The housing structure 4 is provided with a main supply port 22.

Fitted in each sensing valve bore 12 and seating against the shoulder 17 is a fixed valve ring 23, having a bore 24 and an inlet port 25 slightly smaller than the bore 24 and confronting the inlet passage 19. The valve ring 23 is provided with an external annular channel 26 which registers with the corresponding port 13 and is provided with one or more radial passages 27.

The outer end of each sensing valve bore 12 receives a closure plug 28, fitted with a seal ring 29. The ring of closure plugs is held in place by a common retainer ring 30, received in a mounting structure 31 into which one end of the housing structure 4 extends. The nature and construction of the mounting structure as well as the housing may vary substantially depending upon the mechanism requiring the shaft 1 and its bearing.

Each sensing valve bore 12 receives a reciprocal sensing valve piston 32, having a valve head 33 of essentially the same diameter as the inlet port 25. Adjacent the valve head 33, the piston 32 is provided with an annular channel 34, which communicates with the radial passages 27. As will be brought out in more detail hereinafter, the inlet port 25 and the valve head 33 form cooperating valve lips 35 and 36, shown best in FIGS. 4 and 5, which, even in their "closed" position do not form a complete seal.

The outer end of the piston 32 is enlarged to fit a sensing valve bore, as indicated by 37. The outer extremity of the piston forms with the closure plug 28 a pressure sensing chamber 38. The end of the closure plug facing into the pressure sensing chamber is provided with a recess 39. The enlarged end 37 forms with the outer end of the valve ring 23 a damping chamber 40.

One or more restricted passages 41 extend between the pressure sensing chamber 38 and the damping chamber 40 through the enlarged end 37 of the piston. Also, one or more restricted passages 42 extend between the pressure sensing chamber 38 and the channel 34. The external surface of the enlarged end 37 forms a bearing land 43, confronting the surface of the sensing valve bore 12. A second bearing land 44, formed between the channel 34 and the enlarged end 37, confronts the bore 24 of the fixed valve ring 23. Each sensing valve piston 32 is provided with an axially extending bore 45, exposed to the inlet cavity 18, and provided with a constricted port 46 communicating with the pressure sensing chamber 38. Branching radially from the bore 45 are bearing land passages 47 and 48, communicating with the bearing lands 43 and 44, respectively, to provide lubrication for the sensing valve piston.

Operation of the embodiment of the fluid lubricated bearing and pressure sensing control valve illustrated in FIGS. 1 through 5 is as follows:

The bearing and control valve are intended primarily for use of air or other gas as a lubricant. However, its operation is not limited to a gaseous lubricant, but may utilize a liquid lubricant. In either case, the nature of the bearing and sensing valves permits the use of lubricant having low viscosity, thus permitting operations at higher speeds with minimal friction due to the lubricant itself so that the need of special cooling of the lubricant is minimized if not eliminated.

Prior to starting rotation of the shaft, lubricant under pressure is supplied through the port 22 and manifold channel 20 to all of the pressure sensing control valves. As the valves do not completely close, fluid is admitted to each of the bearing lubricant cavities 6, through its corresponding pressure sensing valve; that is, through channel 34, radial passages 27, channel 26 and the ports 13. Lubricant fluid is also admitted to each of the pressure sensing cavities 11 through the axial bore 45, constricted port 46, pressure sensing chamber 38 and ports 15. Each pressure sensing control valve is, insofar as the main flow of fluid is concerned, a balanced valve; that is, the pressure excited by the fluid as it flows from chamber 18 to passages 13 does not influence the position of the valve.

Initially, before the lubricant reaches operating pressure, the journal 2 rests on the lower side of the bearing surface. As the lubricant reaches its operating pressure, the lubricant vents from the upper bearing cavities 6 and pressure sensing cavities 11, with the result that a pressure drop occurs in the upper pressure sensing chambers 38, causing the upper valves to move towards a closed position with corresponding pressure drop in the upper bearing cavities 6 and a net upward thrust of the lubricant in the lower bearing cavities to lift the journal from the bearing surface so that the shaft is in condition for rotation.

When a rotational force is applied, the position of each valve adjusts in accordance with the pressure existing in its pressure sensing chamber 38 and its corresponding pressure sensing cavity 11. It should be noted that the axial travel of the valve piston is quite small and may be in the order of only a few thousandths of an inch so that the adjustment of the valve piston to changes in pressure in its pressure sensing chamber 38 may be extremely rapid. In order to control the rate of movement of the piston, the damping chamber 40 provides a back pressure on the enlarged end 37, counteracting the pressure in the sensing chamber 38. The size and number of the restricted passages 41 and 42, the size of the port 14 communicating with the vent cavity 9 are selected to obtain the desired response of the valve piston and to prevent a hunting or fluttering condition. cavity It is intended that the pressure sensing valve will have high "gain." For example, when the journal 2 moves toward a pressure sensing cavity 11, causing a reduction in volume in the cavity, there is a slight rise in the pressure of the lubricant in the cavity 11 and its corresponding pressure sensing chamber 38. This causes the valve piston to open further so as to admit pressure lubricant to the corresponding bearing cavity 6. The volume of lubricant admitted is substantially greater than the change in volume occurring in the cavity 11 which causes the increased opening of the valve piston. When the pressure of the lubricant in the cavity 6 counterbalances the radial movement of the journal, or perhaps causes a movement in the opposite direction, a drop in pressure occurs in the cavity 11 resulting in a drop in pressure in the sensing chamber 38 and the movement of the piston toward its closed position. However, as indicated previously, the size and number of the restricted passages 41 and 42 and the constricted port 46, in conjunction with the pressure feedback force acting on the feedback pressure surface 49, prevents fluttering or hunting of the valve piston.

Reference is now directed to FIGS. 6 through 9. The construction here illustrated is directed particularly to a modified form of the pressure sensing control valve which may be adapted to the conical journal and bearing body of FIGS. 1 through 5, but is shown in connection with a cylindrical journal and bearing body. More specifically, a shaft 51 includes a cylindrical portion terminating at a shoulder 52, against which is fitted a thrust bearing disk 53. The shaft is surrounded by a cylindrical sleeve bearing 54, the outer periphery of which is surrounded by opposed beveled faces 55. The sleeve bearing is received in a housing 56, having a beveled internal portion 57 mating with one of the beveled faces 55. A beveled mounting ring 58 is attached to the housing 56 and engages the other beveled face of the bearing 54 so as to secure the sleeve bearing in position.

Figure 6:
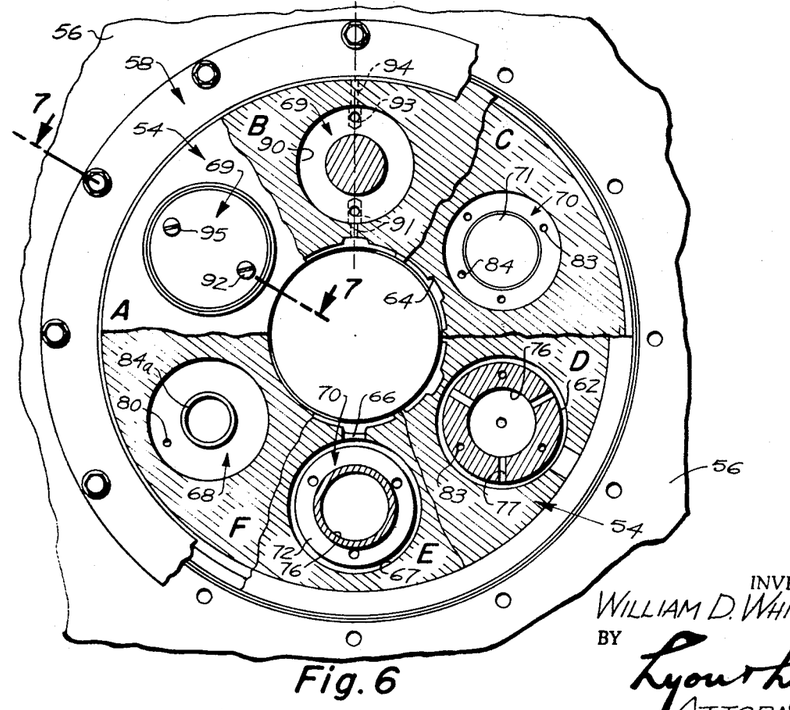
FIG. 6 is a transverse sectional view, showing a cylindrical bearing and a set of pressure sensing control valves, portions taken in different planes, indicated by A, B, C, D, E and F.
Figures 7, 8, 9:
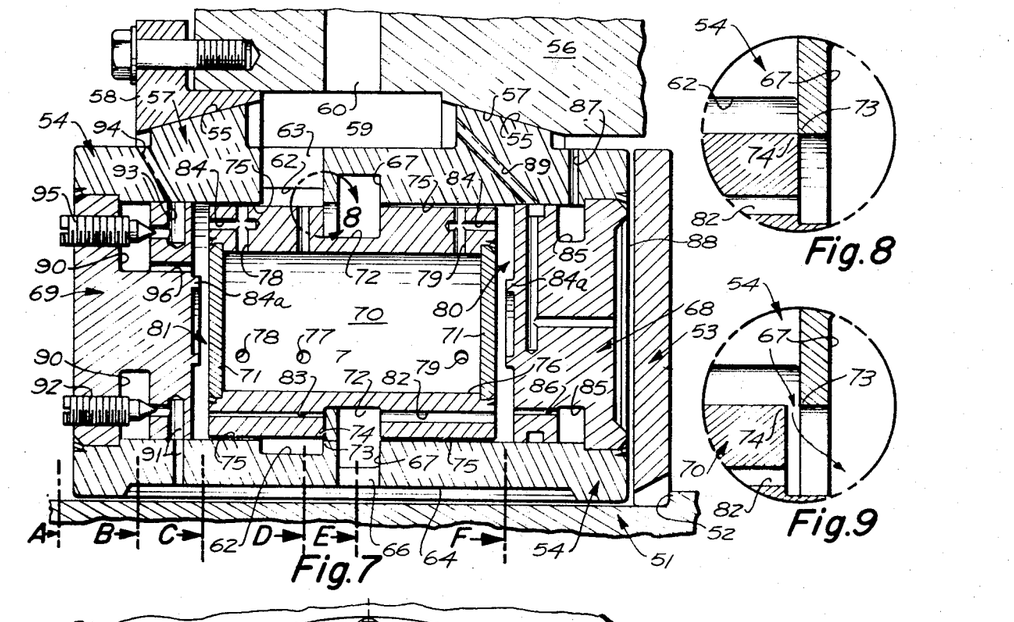
FIG. 7 is an enlarged fragmentary sectional view, taken through 7—7 of FIG. 6, showing one of the pressure sensing control valves, and indicating by A, B, C, D, E and F the section planes of FIG. 6.
FIG. 8 is a further enlarged fragmentary sectional view, taken through Circle 8 of FIG. 7, showing particularly the sensing valve inlet port in its closed or minimum flow condition.
FIG. 9 is a similar fragmentary sectional view, showing the inlet port in its open condition.

Between the beveled portions 55, the sleeve bearing 54 forms with the housing 57 an annular inlet manifold 59, having a main inlet port 60.

The bearing 54 is provided with a set of axially extending sensing valve bores 61, corresponding to the sensing valve bores 12 of the first described structure. Each bore 61 is provided with an annular inlet channel 62, connected by a port 63 to the inlet manifold 59. The bore of the sleeve bearing 54 confronting the shaft 51 is provided with a set of bearing or lubricant cavities 64, separated by webs 65 and terminating inwardly from the axial ends of the sleeve bearing. A port 66 connects each bearing cavity 64 to an annular outlet channel 67 formed in the corresponding sensing valve bore 61 and axially offset from the inlet channel 62.

Each sensing valve bore 61 is closed at its ends by end plugs 68 and 69, which form with the sensing valve bore 61 a cylindrical chamber in which is mounted a valve piston 70 in the form of a hollow cylinder, closed at its ends by disks 71. Externally, each valve armature is provided with an annular connecting channel 72 positioned to bridge between the corresponding inlet channel 62 and outlet channel 67. Corresponding portions of each inlet channel 62 and corresponding annular connecting channel 72 form cooperative valve lips 73 and 74 which serve to regulate the flow of lubricant fluid from the inlet channel 62 through the connecting channel 72 and outlet channel 67 to the ports 66 communicating with the bearing cavities 64.

At either side of the connecting channel 72, th valve piston 70 forms bearing lands 75 which confront the cylindrical walls of the corresponding sensing valve bore 61. The valve piston forms a cylindrical chamber 76, closed by the end disks 71. The radial walls of the valve piston are pierced with small inlet passages 77, communicating between the corresponding inlet channel 62 and the chamber 76. Other radial passages 78 and 79 communicate between the chamber 76 and the bearing lands 75 so that a lubricant film is maintained around the piston 70 to reduce to a minimum the friction associated wijh movement of the piston.

The axially inner end of each piston 70 forms with the adjacent inner end plug 68 a sensing chamber 80. Similarly, the outer end of each piston forms with the corresponding outer end plug 69 a damping chamber 81. The sensing chamber 80 corresponds in function to the sensing chamber 38 of the first described structure and the damping chamber 81 corresponds to the damping chamber 40 thereof. One or more axially extending sensing chamber passages 82 connect the channel 72 with the sensing chamber 80, and a similar set of passages 83 connect the channel 72 with the damping chamber 81. The effective area of the passages 83 is less than the area of the passages 82. One or more of the radial passages 78 and 79 are intersected by axial passages 84, communicating respectively with the chambers 80 and 81. Each of the walls of the end plugs 68 and 69 or the end disks 84 confronting the chambers is provided with an annular stop ridge 84a.

The inner end plug 68 is provided with an annular vent channel 85, which communicates with the sensing chamber through a restricted passage 86. A vent outlet 87 registers with the channel 85 and extends through a wall of the sleeve bearing 54. The axially inner end of the end plug 68 confronts the thrust bearing disk 53 and forms therewith a thrust bearing cavity 88. The thrust bearing cavity communicates with the inlet manifold channel 59 through a supply passage 89, extending partially within the end plug 68 and partially within the sleeve bearing 54.

The outer end plug 69 is also provided with an annular vent channel 90, which communicates through a vent passage 91, formed partially in the end plug and partially in the sleeve bearing, with a corresponding bearing cavity 64. A needle valve 92 accessible from the outside of the end plug 69 controls the flow through the vent passage 91. A second vent passage 93 communicates between the vent channel 90 and the exterior of the sleeve bearing 54 through a restricted vent outlet 94, which is controlled by a second needle valve 95, accessible from the exterior of the end plug 69.

Operation of the fluid lubricated bearing and pressure sensing control valve shown in FIGS. 6 through 9 is as follows:

As in the first described structure, the pressure fluid in its flow from the inlet 63 through channels 62, 67 and 72 to passage 66, exerts equal force in opposite directions and does not effect a change in the position of valve piston 70.

Also as in the first described structure, under initial static condition when a pressurized lubricant is supplied, the shaft tends to center itself as the lubricant tends to vent axially from the upper bearing cavities 64, causing a drop in pressure to be communicated from these cavities through the passages 82 to the upper sensing chambers 80. This is accomplished more readily than the communication with the damping chambers 81, with a result that the upper valve pistons move in a direction to close the spacing between the valve lips 73 and 74, while the lower valve piston moves in a direction to increase the spacing between the valve lips 73 and 74. The net result is that the shaft is lifted or suspended free of the bearing ring prior to rotation. When the shaft is rotated, this condition is maintained; that is, a slight increase in pressure caused by movement of the shaft radially in a direction to reduce the volume of a bearing cavity 64 is sensed by increased pressure in the sensing chamber 80, which opens the spacing between the valve lips 73 and 74, causing lubricant fluid to be supplied to the cavities 64 and exert an opposing force on the shaft and to return the shaft to its central position.

This condition is momentary for after a short delay determined by the effective area of the damping chamber passages 83, the change is pressure is felt in the damping chamber 81, causing the pressures in the cavities 64 to adjust so that the shaft is properly suspended in the bearing. Lubricant is continuously fed into the sensing chamber through the corresponding perforation 84 and is vented therefrom through the vent passage 86. The two needle valves 92 and 95 control the flow from the passage 91 to the vent outlet 94 or the passage 96 to the damping chamber 81 to alter the damping effect.

The end plugs 68 cooperate with the thrust bearing disk 53. In the structure illustrated, a constant supply of lubricating fluid is delivered to thrust bearing cavities 88. However, where conditions warrant, the pressure sensing valve structure employed to control the flow of air to the bearing cavities 64 may be employed.

Figure 10:
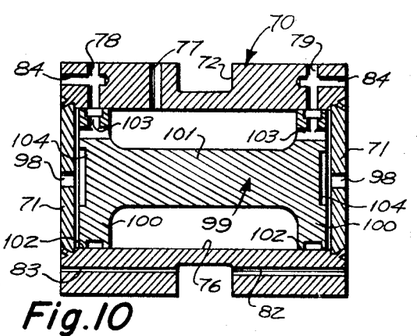
FIG. 10 is a sectional view of the pressure sensing control valve armature, as illustrated in FIG. 7, to which has been added an inertia device.

Reference is now directed to FIG. 10; this construction utilizes the valve piston 70 as previously described except that a port 98 is located at the center of each end disk 71 in addition to the ports 84. Also, the chamber 76 receives an inertia spool or mass compensator 99, having relatively thick end flanges 100 connected by a stem 101. The peripheries of the flanges 100 form bearing lands 102 which are supplied with lubricant through T-passages 103, communicating with the chamber 76, and with the radial passages 77 and 79. The T-passages 103 also provide communication between the end ports 98 and the chamber 76. The ends of the compensator spool are provided with recesses 104.

The compensator spool operates as follows:

When the differential pressure acts on the ends of the valve piston, the compensator spool tends to move first, followed almost instantly by movement of the valve piston. Then the ratio of pressure forces acting on the compensator spool to the mass inertial force of the compensator spool is smaller than the ratio of the pressure forces acting on the valve piston to its mass inertia force. This causes the compensator spool to move with respect to the valve piston and change the differential pressure to initiate conditions for deceleration of the valve piston during acceleration. The mass compensator function of the spool increases the change in pressure required to effect movement of the piston valve.

Reference is now directed to FIG. 12 which is a diagram which illustrates the time and pressure relationship between the lubricant pressure as sensed and as applied to the shaft. The diagram is applicable to the embodiment shown in FIGS. 1 through 5 as well as the embodiments shown in FIGS. 6 through 9. PB represents the pressure at the bottom of the shaft, while PT represents the pressure at the top of the shaft. C represents the sensed pressure change; whereas, G represents the pressure gained. in this regard, if the sensed pressure change is negative, the gain is likewise negative. Tests have indicated that the gain may be many times the sensed pressure change and the amount of gain is determined by the overall size and relative size of the various passages. The sensed pressure change will reach its peak slightly ahead of the peak gain in pressure, the difference being indicated by RT in the diagram.

Figure 14:
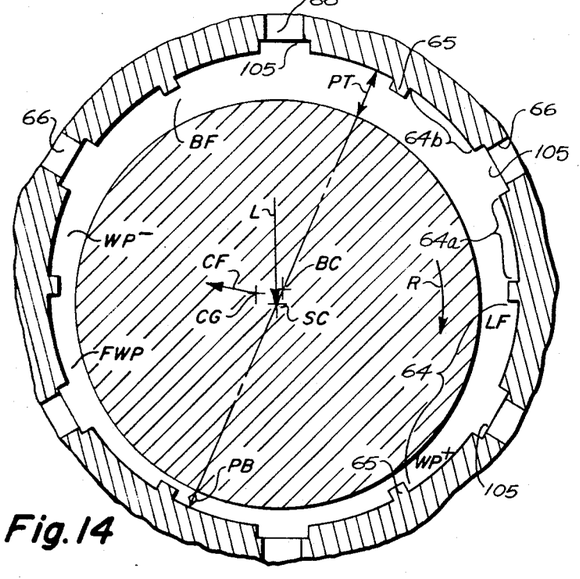
FIG. 14 is an enlarged fragmentary diagrammatical sectional view of a shaft and the surrounding bearing, with the bearing film thickness and the eccentricity of the shaft greatly exaggerated for purposes of illustration.

Reference is now directed to FIG. 14, which is a diagrammatical view of the shaft and confronting portion of the bearing. The eccentricity of the shaft and the spacing between the shaft and bearing is greatly exaggerated for purposes of illustration. In FIG. 14, L represents the load on the shaft, PB represents the pressure at the bottom of the shaft, PT represents the pressure at the top of the shaft, and the space between the shaft and bearing, designated LF represents the lubricant film. During operation, the effective top and bottom of the shaft, which lie in a plane passing through the bearing center BC and shaft center SC, are displaced downward.

The construction illustrated in FIG. 14 is directed particularly to the embodiment shown in FIGS. 6 through 9, but is also applicable to the embodiment shown in FIGS. 1 through 5. Whether the shaft rotates in a single direction as indicated by R, or in both directions, the ports 66 are located in the central region of the bearing cavities 64, and intersect an axially extending channel 105.

The portions of each cavity 64 extending in opposite directions from each channel 105 forms opposed pumping lands 64a and 64b; that is, the rotation of the shaft tends to move the lubricant film with the shaft, creating a dynamic fluid pressure. The dynamic fluid pressure in the pumping land 64a extending in the direction of shaft rotation (clockwise in FIG. 14), the dynamic fluid pressure is positive; hence, produces a signal for increased fluid with increased shaft speed. The dynamic fluid pressure in the pumping land 64b extending in a direction opposite to shaft rotation is negative; hence, produces a signal for decreased fluid with increased shaft speed. That is, the dynamic fluid pressures in the pumping lands 64a and 64b oppose each other. By shifting the location of the inlet channel 105, the effect of the dynamic fluid pressures may be cancelled or made negative or positive depending on the conditions for which the fluid bearing is designed.

A further pumping effect is produced as a result of any convergence or divergence of the shaft and bearing surfaces due to the eccentricity of the shaft. More particularly, a positive wedging pressure WP+ occurs where the shaft and bearing surfaces converge, and a negative wedging pressure WP− occurs where the shaft and bearing surfaces diverge. The amount of convergence or divergence is, of course, small due to the fact that the thickness of the lubricant film is small, and thus the amount of eccentricity of the shaft is minimal.

Ideally, the center of gravity of the rotating mass should coincide with the shaft center, but as a practical matter, this is difficult to attain. For purposes of illustration, the center of gravity, designated CG, is shown as located to one side of the shaft center, creating a centrifical force through the center of gravity, indicated by CF, which tends to produce a whirl or eccentric rotation of the shaft. This force is resisted by the pressures existing at PT and PB and by the wedge lift force.

Figure 13:
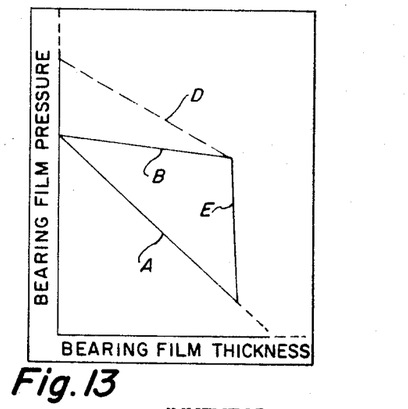
FIG. 13 is a diagram, illustrating the relationship of bearing film thickness to bearing film pressure.

Reference is now directed to FIG. 13 which shows diagrammatically the relationship between bearing film pressure and bearing film thickness, in which line A represents bearing film pressure with the sensing valve held in a near closed position, line B represents the bearing film pressure as increased when the sensing valve is full open, line C indicates the supply pressure. The broken line D indicates the bearing film pressure as increased due to shaft rotation, this being the effect of pumping lands 106. E represents the bearing film pressure as increased with increased flow through the sensing valve.

Figure 11:
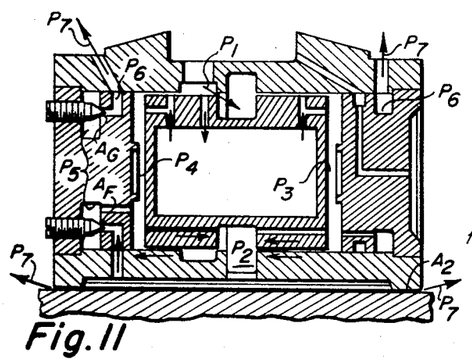
FIG. 11 is a fragmentary diagrammatical sectional view, similar to FIG. 7, illustrating the pressure conditions in the various passages and chambers of the pressure sensing control valve.

Reference is now directed to FIG. 11. This figure illustrates the pressure sensing control valve pressures $P_1$ through $P_7$ and the direction of the fluid weight flow $W_1 \rightarrow _7$ with arrows. The mathematical model of the pressure sensing control valve is an outline of the calculations required to show the control working. These calculations are outlined as follows:

1. Set $P_2$ min with the valve closed and with area $A_2$. Then set $P_3$ max = $P_4$ max with the resistance to flow through the flow passages and calculate the following:
2. Flow $W_1 \rightarrow _3$, and $W_1 \rightarrow _4$
3. $W_3 \rightarrow _7$
4. $W_3 \rightarrow _2$
5. Pressure $P_2$
6. $W_4 \rightarrow _2$
7. $W_4 \rightarrow _5, + W_4 \rightarrow _6$
8. $P_5$, $P_6$, Area $A_G$, and $A_F$ for $P_3 = P_4$.
8. $P_5$, $P_6$, Area $A_G$, and $A_F$ for $P_3 = P_4$.
9. Then set $P_3$ min = $P_4$ min and calculate the flow $W_1 \rightarrow _3$, and $W_1 \rightarrow _4$
10. Flow $W_3 \rightarrow _7$
11. $W_3 \rightarrow _2$
12. Pressure $P_2$
13. $W_4 \rightarrow _2$
14. $W_4 \rightarrow _5, + W_4 \rightarrow _6$
15. $P_5$, $P_6$, $A_G$, and $A_F$ for $P_3 = P_4$.
16. Calculate area $A_G$ with an area $A_F$ for the control to have near "infinite gain" and an incipient change in area $A_2$ will open or close the valve providing $P_2$ ITM. 5 and ITM. 12.
17. Calculate area $A_G$ with an area $A_F$ for the control to have "proportional gain" and the amplification in pressure $P_2$ will be proportional to a small change in area $A_2$. Set volume $P_5$ greater than volume $P_3$ in the sensing circuit for compressible fluids. Set $\Delta P_2 < (P_2$ ITM. 5 − $P_2$ ITM. 12).

Figure 15:
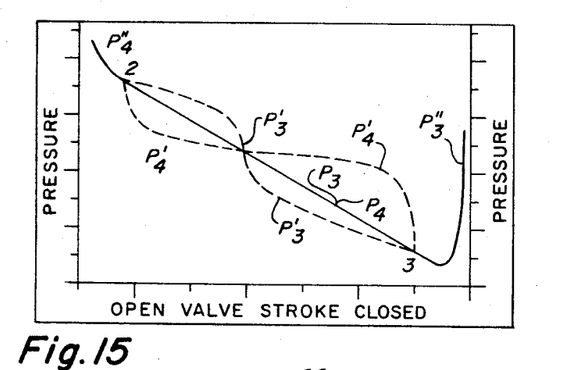
FIG. 15 is a diagram, indicating the relationship between valve output pressure and the movement of the valve armature.

Reference is now directed to FIG. 15. This figure illustrates the change in $P_3$ pressure to pressure $P_3'$ in response to an incipient positive or negative area $A_2$ change. This figure also illustrates the fade out of differential pressure created with the change in $P_3$ between $P_3'$ and $P_4'$ as the valve stroke changes and $P_4$ again equals $P_3$ at another valve position such as position 2 or 3. The calculations required to show this valve action are as follows:

1. Calculate the valve spool inertia forces.
2. Calculate the differential pressure forces available to accelerate the valve spool.

Near the open end of the valve spool stroke $P_4$ increases as indicated with $P_4''$ and near the closed end of the valve spool stroke $P_3$ increases as indicated with $P_3''$ to limit the valve stroke, preventing spool impact with the enclosing structure. This is accomplished with the valve spool end jet flow as the valve spool moves near the end of its stroke.

Referring back to the mathematical theory of fluid bearings and also to FIGS. 11 through 14, it has been demonstrated that:

1. The fluid flow control accomplished by the pressure sensing valve provides for infinite gain or "floating control action" over a wide inlet and discharge range.
2. Increasing the feedback flow and reducing control vent flow from the infinite gain condition, provides the control with lower gain that is proportional to a small change in the discharge exit area. This is "PROPORTIONAL CONTROL ACTION."
3. The controls frequency response is increased by:
   A. Decreasing the reset flow.
   B. Increasing the available differential pressure range for moving the valve.
   C. Decreasing the mass of the valve.
   D. Increasing the ratio of the valve diameter to the valve stroke.
   E. Reducing the required variation in flow through the valve which reduces the valve stroke. For example, the required variation in flow is reduced by increasing the thin slot exit flow resistance in bearings.

4. Varying the control inlet pressure does not adversely affect the control action.
5. Making the reset flow equal to the flow from the opposite end of the valve to the same discharge, isolates the control from responding to changes in the control discharge pressure, except for the feedback control action.
6. Modulating the control vent flow from one end of the valve provides the control with remote pressure sensing capability.
7. Restricting or modulating the flow from the opposite valve end cavity provides the control with override control capability.
8. Increasing the stiffness of the bearing film with the control increases the dashpot damping to resist excessive vibration buildup due to slight rotor unbalance.

For example, the above equations point out that the centrifugal force due to the unbalance of a balanced rotor is greater than the fluid film can support at the natural frequency of vibration of the rotor on the supporting fluid film. These equations also point out that the vibration velocity increases with frequency at a particular vibration amplitude. Therefore since dashpot damping increases with velocity, the natural frequency of vibration only has to be increased until dashpot damping absorbs the excitation energy due to the unbalance of the rotor to prevent vibration amplitude build up. Lower viscosity fluids have lower viscous damping. Therefore, to use lower viscosity fluids and obtain lower viscous friction horsepower losses at high rotational frequencies, the stiffness of the fluid film is increased to increase vibration velocity and also to increase bearing load capacity. The dynamic lift wedge forces and the pumping land lift forces are small if the shaft displacement from the bearing center is small, but these forces combine with the dashpot damping forces and the differential pressure forces created with the control to increase the bearing film stiffness. As pointed out in FIGS. 12, 13 and 14.

Reference is now directed to FIGS. 16 through 31 which are directed to various embodiments of the pressure sensing control valve as adapted to the operation and control of fluid devices other than bearings. More specifically, the embodiment shown in FIGS. 16 through 25 is directed to a fluid motor control wherein the motive fluid is maintained at a preselected pressure.

Figure 17:
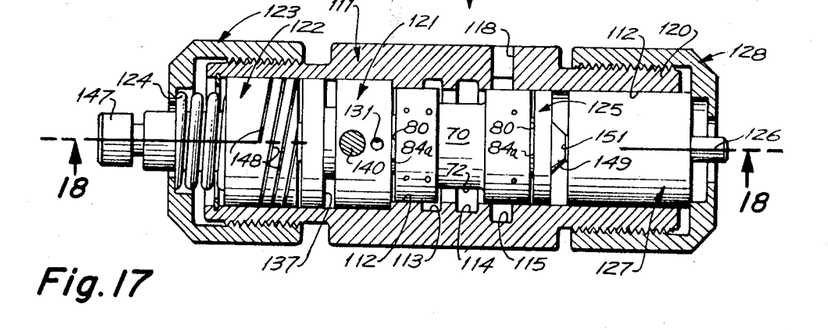
FIG. 17 is an enlarged longitudinal sectional view, taken through 17—17 of FIG. 16.

This embodiment includes a valve body 111, having a longitudinal bore 112 in which is formed an annular inlet channel 113, outlet channel 114 and vent channel 115. An integral internally screwthreaded inlet fitting 116 extends from one side of the valve body 111 and communicates with the inlet channel 113. Similarly, an integral internally screwthreaded outlet fitting 117 extends from the opposite side of the valve body 111 and communicates with the outlet channel 114. The vent channel 115 communicates with a vent port 118. The valve body is also provided with oppositely directed extensions 119 and 120 which are concentric with the extremities of the bore 112 and which are externally screwthreaded.

That portion of the bore 112 within the extension 119 is slightly enlarged and receives a bypass control block or plug 121 which seats against the shoulder formed by the enlarged portion of the bore. Outwardly from the block 121, the bore receives a piston 122. The extension 119 receives an internally screwthreaded fitting 123, which overlies the outer end of the bore 112. A spring 124 is interposed between the fitting or cap 123 and the piston 122.

The opposite end of the bore 112 within the extension 120 receives a manually operated disk 125, provided with an axially extending stem 126, which protrudes from the bore. The stem 126 extends through an end plug 127. An internally screwthreaded fitting 128 is received on the extension 120.

Mounted between the plugs 121 and 127 is a valve piston 70 which may be identical to the valve piston described in connection with FIGS. 6 through 9 and to which the same reference characters are applied. Also, relating to the previous construction, a sensing chamber 80 is formed between the piston 70 and the disk 125 and a damping chamber 81 is formed between the piston and the end plug 121.

Figure 19:
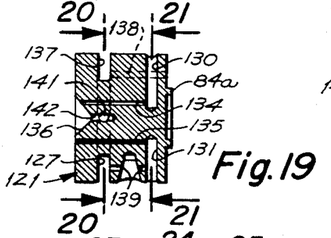
FIG. 19 is a sectional view of the bypass control block or plug shown in FIG. 17 and 18.
Figure 20:
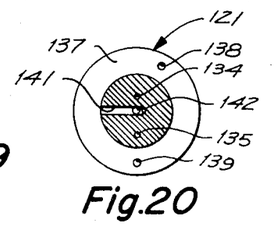
FIG. 20 is a transverse sectional view thereof, taken through 20—20 of FIG. 19.
Figure 21:
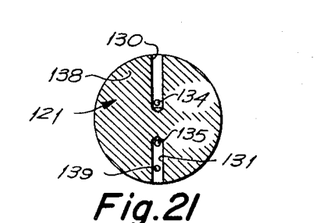
FIG. 21 is a transverse sectional view thereof, taken through 21—21 of FIG. 19.
Figure 22:
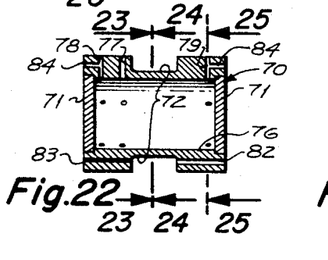
FIG. 22 is a sectional view of the valve piston shown in FIGS. 17 and 18.
Figure 23:
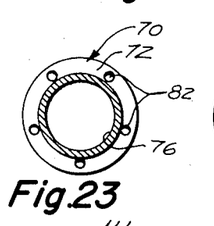
FIG. 23 is a transverse sectional view thereof, taken through 23—23 of FIG. 22.
Figures 24, 25:
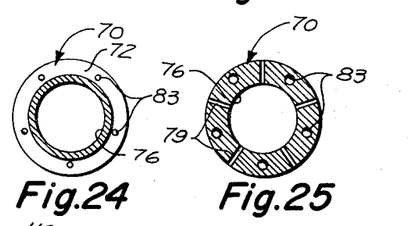
FIG. 24 is a transverse sectional view thereof, taken through 24—24 of FIG. 22, in the opposite direction from FIG. 23.
FIG. 25 is a transverse sectional view, taken through 25—25 thereof.

The bypass control plug 121 is provided with a pair of diametrically disposed sockets 130 and 131, which are connected respectively with the inlet fitting 116 through a bypass inlet 132 and with the outlet fitting 117 through a bypass outlet 133. The sockets 130 and 131 are joined to axially extending constricted passages 134 and 135 respectively. The passage 134 intersects a conical valve seat 136 formed in the outer end of the plug 121, whereas, the passage 135 intersects the outer end of the plug at one side of the valve seat 136.

The plug 121 is provided with a circular channel 137 which is connected by a constricted passage 138 to the damping chamber 81 and also through a cross passage 139 to the socket 131. A screw valve 140 having a tapered inner end intersecting the cross passage permits adjustment of the flow through the cross passage.

The channel 137 is provided with a radial passage 141, intersecting a central socket 142 of small diameter centered in the conical valve seat 136. The piston 122 is provided with a central valve tip 143 which engages the valve seat 136. The piston 122 is provided with a central stem 144, having a central passage 145 constricted at its inner end to form a valve seat. Outwardly therefrom the passage 145 is intersected by a side passage 146. The passage 145 is internally screwthreaded to receive a needle valve 147. The needle valve controls the venting of fluid through the passage 145 and side passage 146. The piston 122 may be sealed in the bore 112 by a labyrinth seal channel 148.

At its juncture with the stem 126, the disk 125 is provided with a valve seat 149 and the opposing portion of the end plug 127 is provided with a valve face 150. A constructed port 151 extends alongside the stem 126 within the valve seat 149 so as to be closed when the disk 125 is seated against the end plug 127. In addition, radially outward from the valve seat 149, the disk 125 is provided with one or more equalizer ports 152. Also, the end plug 127 is provided with a vent passage 153.

The screwthreaded fittings 123 and 128, the screw valve 140 and the needle valve 147 are provided with conventional friction plugs 154 which serve to assure that these members will not change their adjustment during operation of the valve.

Operation of the valve illustrated in FIGS. 16 through 25 is as follows:

The valve piston operates in the same manner as the valve piston described in connection with FIGS. 6 through 9. More particularly, if a slight change in pressure occurs at the outlet fitting 117, this pressure change is communicated to the sensing chamber 80, causing the valve piston to open, permitting transient peak flow to the outlet and to whatever device connected therewith. This peak flow is momentary for the pressure soon equalizes in the damping chamber 81, partially reducing the flow until it is in proportion to the demand. By way of example, if the sensing valve is connected to a hydraulic or pneumatic motor, increased torque on the motor will cause a rise in pressure in the outlet fitting 117, causing the valve to open and supply more fluid to maintain the motor in operation.

In some applications, it is desirable that the pressure supplied to the tool not exceed a predetermined value. For instance, if the fluid motor operates a torque wrench, it may be desirable to limit the torque to a predetermined value. This may be accomplisned by adjusting the fitting 123 which may be considered as a torque control. By adjustment of the torque control, a predetermined pressure at the outlet fitting 117 will open the valve tip 143 so that fluid is now admitted from the inlet fitting 116 through the passage 134. As a result, pressure is applied through the radial passage 141 and passage 138 to the damping chamber 81, forcing the valve piston 70 toward its closed position. The rate at which the valve piston closes is dependent upon the rate at which fluid is vented through ports 152 and passage 153. As a consequence, the torque motor is relaxed momentarily so that the tool may be removed from the bolt or other device to which the torque was applied. The sensing valve formed by the lips 73 and 74 does not completely close so that when the torquing tool is applied to another device, the resistance to rotation builds up a back pressure which causes the valve piston to open, supplying motive fluid in accordance with the back pressure supplied to the sensing chamber 80.

As has been pointed out previously, it is not intended that the valve lips 73 and 74 form a complete seal. The minimum distance between the valve lips determines the minimum flow through the sensing valve. This minimum flow may be adjusted by adjustment of the fitting 128.

The disk 125 and its stem 126 provides a manual means to overcome the control afforded by the valve; that is, by pressing inward on the exposed end of the stem 126, the valve can be manually forced to its full open position so that full motive fluid pressure may be applied to the tool or other device connected therewith. The relative size of the port or ports 151, equalizer ports 152 and vent passage 153 are such that once the disk 125 is unseated from the valve seat 149 there is a pressure built up behind the disk which supplements the pressure applied manually. However, once the stem 126 is released, the valve port formed by the valve seat 149 and valve face 150 closes.

Figures 26, 27:
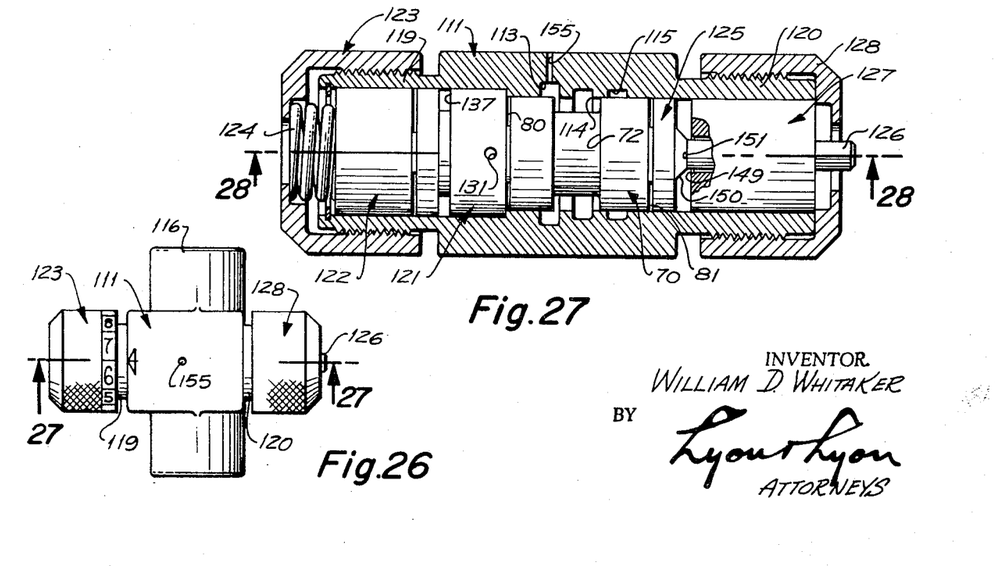
FIG. 26 is an elevational view of a modified form of the pressure sensing control valve.
FIG. 27 is an enlarged longitudinal sectional view thereof, taken through 27—27 of FIG. 26.
Figure 28:
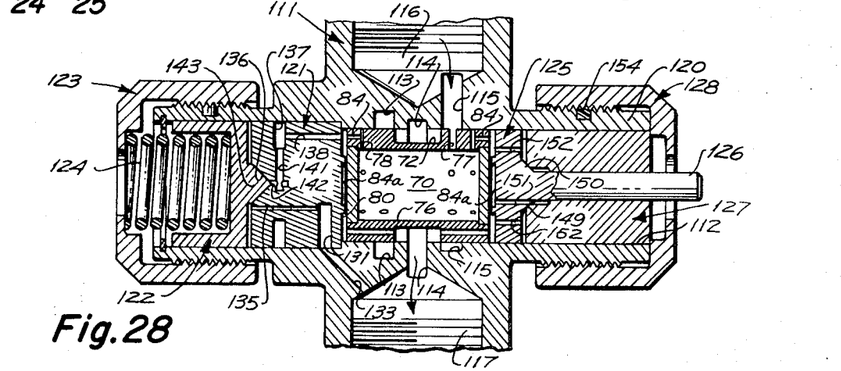
FIG. 28 is a longitudinal sectional view thereof, taken through 28—28 of FIG. 27.

Reference is now directed to FIGS. 26, 27 and 28. This embodiment of the pressure sensing control valve is adapted for use as a highly sensitive and accurate pressure regulator, intended primarily for use with air or a gas, but not limited thereto. Most of the parts, including the valve piston 70, are retained and are given similar reference characters. However, the needle valve 147, adjustment valve 140 and associated passages are omitted as well as bypasses 132 and 133. The functions of channels 113 and 115 are reversed, as well as the sensing chamber 80 and damping chamber 81. In place of the relatively large vent port 118, a restricted vent port 155 is provided. The opposing passages 82 and 83 are similar in size and both function to effect a damping or stabilizing action of the valve piston 70.

Operation of the pressure sensing control valve, as adapted for use as a pressure regulating valve, is as follows: chamber 80

When the pressure downstream from the outlet fitting 117 increases, a backflow occurs in passages 133, 113 and 135 to increase pressure against the piston 122, causing the valve 143 to open. The pressure in the chamber 80 is normally equal to pressure at the inlet fitting 116, by reason of the connection through passage 77, chamber 76 and passages 78 and 84, and thus is higher than the pressure at the fitting 117. Consequently, flow occurs momentarily from the chamber 80 through passages 138, channel 137 and passages 141 and 142. This causes the valve piston 70 to move toward its closed position, reducing flow from the inlet 116 to the outlet 117.

When the pressure downstream from the fitting 117 decreases, the piston 122 causes the valve 143 to close, permitting pressure to build up in chamber 80, which causes the valve piston 70 to move toward it open position.

When used as a regulator valve, the adjustment afforded by the screw cap 128 is usually not needed, unless a maximum flow adjustment is desired.

Figures 29, 30:
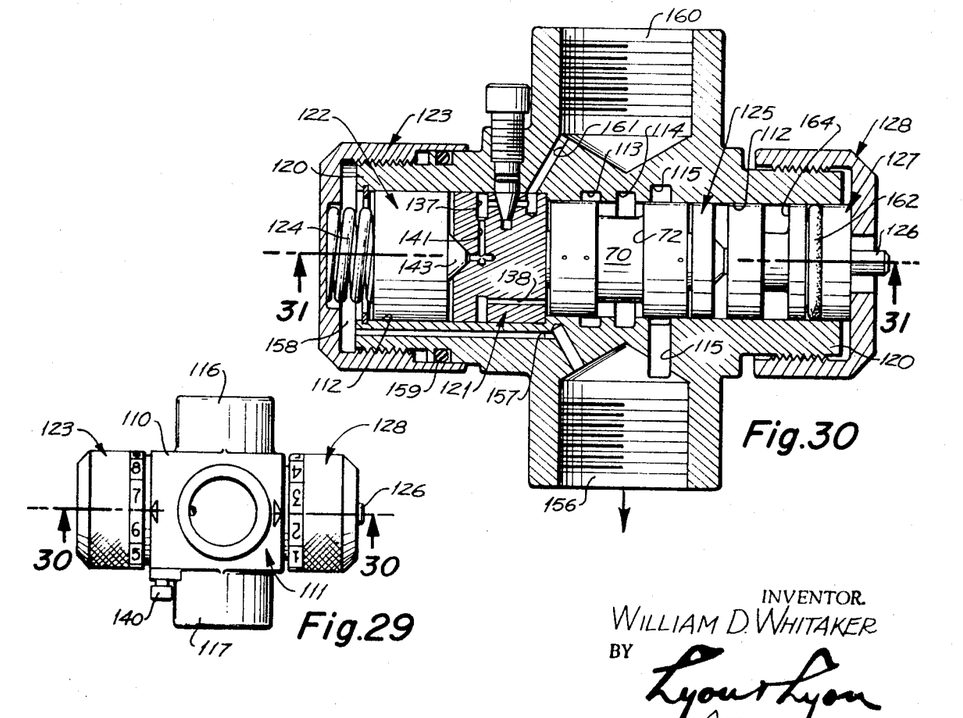
FIG. 29 is an elevational view of a further modified form of the pressure sensing control valve.
FIG. 30 is an enlarged longitudinal sectional view thereof, taken through 30—30 of FIG. 29.
Figure 31:
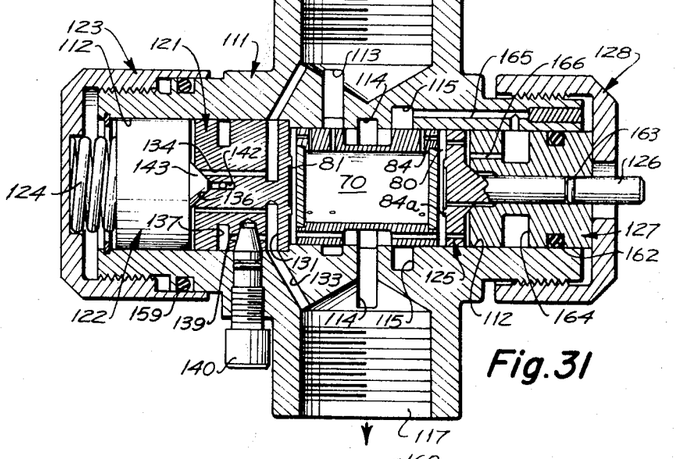
FIG. 31 is a longitudinal sectional view thereof, taken through 31—31 of FIG. 30.

Reference is now directed to FIGS. 29, 30 and 31. This embodiment of the pressure sensing control valve is adapted for use as a fluid motor control in cases wherein it is desired to reuse the liquid; for example, in a closed system whether the fluid be a gas or a liquid. Also, this embodiment is intended to be responsive to an extraneous sensing device such as a device responsive to temperature, pressure, acceleration forces or other forces. The pressure sensing control valve being responsive to a signal from the sensing device to effect control of a fuel or other motive fluid, while utilizing only a small amount of the total fluid in the system.

This embodiment is closely related to the construction shown in FIGS. 16, 17 and 18 and most of the reference characters used in the preceding embodiment apply. The essential changes are those which permit a closed system; more specifically, the body 111 is modified to provide a return flow fitting 156 connected to the vent channel 15 in place of an exhaust. The fitting 156 is connected by a passage 157 to the region between the body 111 and the cap 123. The cap is modified to provide a closed end so as to form a closed pressure chamber 158 and the cap skirt is provided with a seal ring 159. A sensing port fitting 160 is added 4o the valve body 111, and is connected by a passage 161 to the circular channel 137.

The end plug 12 is provided with a seal ring 162 and the stem 126 is provided with a seal ring 163. Also the end plug 127 is provided with an annular channel 164 connected by a passage 165, formed in the valve bozy 111, with the channel 115. Also, a passage 166 connects the channel 164 with the chamber formed between the end plug 127 and the disk 125.

Operation of the embodiment shown in FIGS. 29, 30 and 31 is essentially the same as the embodiment shown in FIGS. 16, 17 and 18, except that it is installed in a closed system. Port 156 is connected to a tank or reservoir, not shown. Port 160 is connected to a sensing device, not shown, which, in turn, is connected to the tank or reservoir. Pressure changes at port 160 causes the valve piston 70 to respond by appropriate increase or decrease in flow to the motor or other apparatus connected with the valve.

Figure 32:
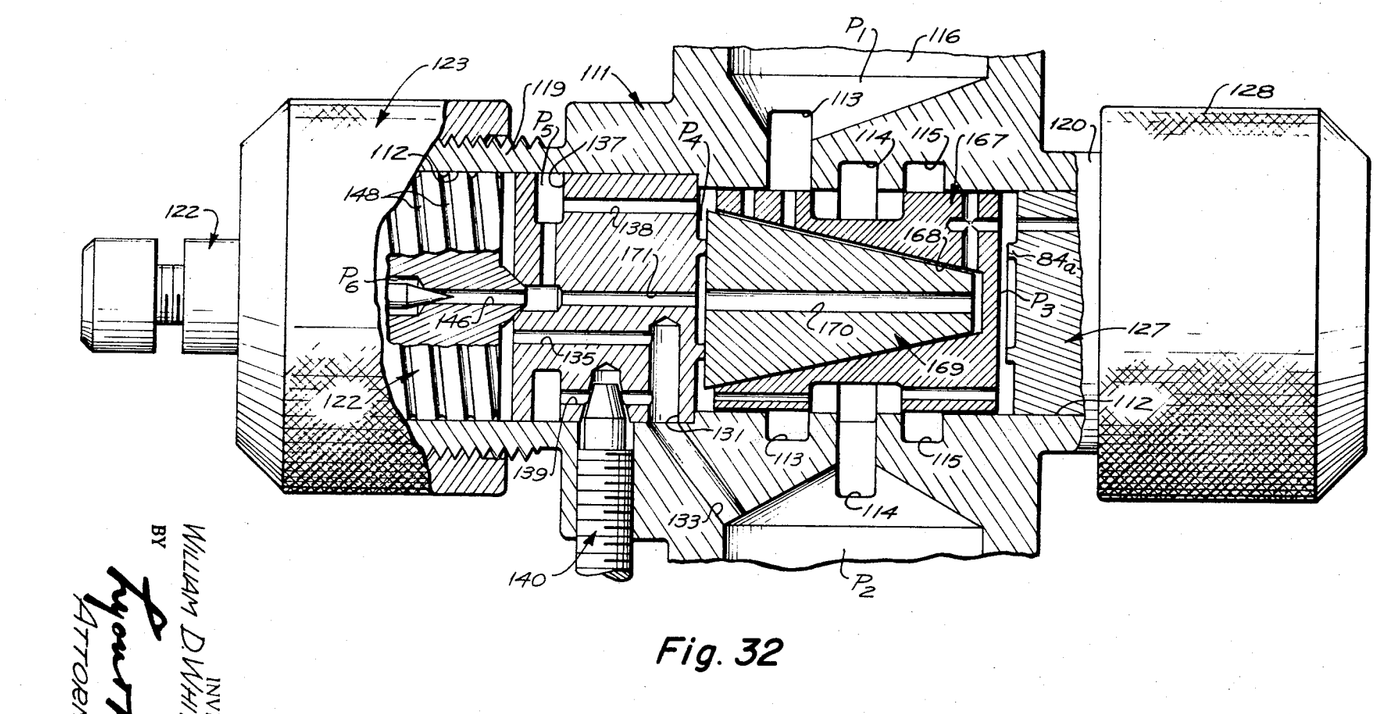
FIG. 32 is a fragmentary sectional view, similar to FIG. 7, illustrating a modified form of the pressure sensing control valve.

Reference is now directed to FIG. 32 which illustrates a modified piston valve 167 which may be substituted for the valve piston 70 in any of the preceding embodiments of the pressure sensing control valve. For purposes of illustration, the modified piston valve is shown in relation to the embodiment illustrated In FIGS. 16 through 18.

The modified piston valve 167 is provided with a conical bore 168 closed at its smaller end and diverging toward the damping chamber 81. Received in the bore 168 is a cone 169, having a longitudinal passage 170. The valve piston 167, like the valve piston 70, is provided with an external annular channel 72, a set of sensing chamber passages 82 and damping chamber passages 83 communicating respectively with the sensing chamber 80 and damping chamber 81. Also, sets of passages 77, 78 and 79 extend radially from the conical bore 168. The passages 79 are intersected by axial passages 84, communicating with the sensing chamber 80.

The surrounding parts of the pressure sensing control valve are the same as in FIGS. 16, 17 and 18, except that a passage 171 continues from the socket 142 to the damping chamber 81.

The conical space between the cone 169 and the confronting walls of the valve piston 167 forms a chamber which supplements or supercedes the function of the damping chamber 81. That is, fluid into and out of the conical chamber, as the valve piston 167 moves to increase or decrease fluid flow, produces a damping action. Normally the cone 169 does not move away from the annular rib 84a; instead, it is held fixed by fluid pressure, except it tends to center itself within the valve piston 167 just as the piston tends to center itself in the bore 75. As is the case with the valve piston 70, the fluid forces acting on the valve piston 167 function in a manner analogous to a spring.

It should be noted that the embodiments shown in FIGS. 16 through 32, as well as the previous embodiments, the pressure fluid passing through the main passageways from the inlet to the outlet exerts equal force in opposite directions on the valve piston 70 or 167 so that this, the main portion of the fluid, does not cause any movement of the valve piston; thus, the valve piston tends to remain in fixed position unless change in pressure in the sensing or damping chamber occurs. Only the very small volume of the pressure fluid present in the sensing chamber 80 or damping chamber 81 is effective in moving the valve piston, and the total movement of the valve piston is quite small. Also, the forces required to effect movement of the valve piston is low because the valve piston is fluid supported. Still further, the passages communicating with the sensing and damping chambers are quite small and may be of such size that the fluid moves by capillary action. The passages which vent fluid from the sensing and damping chambers are smaller than the passages supplying fluid thereto to permit the buildup or drop in pressure necessary to move the valve piston.

I claim:

1. A fluid lubricated bearing, comprising:
   a. a bearing body including a bearing wall confronting a rotatable shaft, said bearing wall having a set of fluid receiving bearing cavities, and said bearing body also including a corresponding set of fluid receiving pressure sensing cavities;
   b. said bearing body also having a set of valve bores corresponding to said bearing and sensing cavities, pressurized lubricant fluid supply passages communicating individually with said valve bores, and fluid exchange passages communicating between each valve bore and a corresponding bearing cavity and sensing cavity;
   c. a valve reciprocable in each valve bore between an open position for supplying fluid to the corresponding bearing cavity, and a closed position minimizing the supply of fluid thereto;
   d. each of said valves defining with said bearing body a pressure chamber and, upon predetermined decrease in pressure therein, movable toward its closed position and, upon predetermined increase in pressure therein, movable toward its open position,
   e. said pressure chamber being continuously exposed to said fluid supply, and continuously in communication with a corresponding sensing cavity;
   f. and means restricting supply of fluid to said pressure chamber whereby the pressure in said pressure chamber varies with pressure in said sensing cavity to cause said valve to open when pressure in said sensing cavity increases, and to close, when pressure in said sensing chamber decreases.

2. A bearing, as defined in claim 1, wherein:
   a. a portion of said fluid is directed between each valve and its bore to suspend said valve therein.

3. A bearing, as defined in claim 1, wherein:
   a. the bearing is adapted to be supplied with a gaseous fluid.

4. A bearing, as defined in claim 1, wherein:
   a. the bearing is adapted to be supplied with a liquid fluid.

5. A fluid lubricated bearing, comprising:
   a. a bearing body including a bearing wall confronting a rotatable shaft, said bearing wall having a set of fluid receiving bearing cavities, and said bearing body also including a corresponding set of fluid receiving pressure sensing cavities;
   b. valve means for supplying a pressurized lubricant fluid to each of said bearing cavities and its corresponding sensing cavity, said valve means movable in response to an increase in pressure in the corresponding sensing cavity to increase the supply of fluid to its related bearing cavity, and movable in response to decrease in pressure in said sensing cavity to decrease the supply of fluid to said bearing cavity.

6. A bearing, as defined in claim 5, wherein:
   a. said sensing cavities also confront the shaft and a bleed cavity confronting the shaft separates each sensing cavity from its corresponding bearing cavity.

7. A bearing, as defined in claim 5, wherein:
   a. said cavities are incorporated in said valve means.

8. The combination with a source of lubricant fluid under pressure, a fluid lubricated bearing and a shaft defining with the bearing a set of pressure fluid receiving cavities, the walls of each cavity forming a pressure fluid operating means, of a pressure sensing valve for each pressure fluid operating means, comprising:
   a. a valve body structure having a valve cavity intersected by an inlet port connected with the pressure fluid source and an outlet port connected with the pressure fluid operated means;

b. a pressure sensing means in the cavity defining a passageway between the inlet port and outlet port, and movable to regulate the supply of pressure fluid from the inlet port through the outlet port thereby to control the pressure fluid operated means, said passageway having opposed walls of equal area whereby the pressure sensing means is insensitive to pressure in said passageway;

c. the cavity and pressure sensing means having confronting walls forming an expansible and contractible pressure sensing chamber to effect, upon increase of pressure therein, movement of the pressure sensing means in a direction to increase flow of fluid to the operated means, and to effect, upon decrease of pressure therein, movement of the pressure sensing means in a direction to decrease flow of fluid to the operated means;

d. means forming a restricted passageway between the outlet port and the pressure sensing chamber for effecting movement of the pressure sensing means;

e. and means for damping the movement of the pressure sensing means.

9. The combination with a source of lubricant pressure fluid, and a pressure fluid operated means in which a pressure fluid is circulated therethrough, of a pressure sensing valve, comprising:

a. a rotatable element;

b. a bearing body structure confronting the rotatable element and having a set of cavities, each intersected by an inlet port connected with the pressure fluid source and an outlet port connected with the pressure fluid operated means;

c. a pressure sensing means in each cavity defining a passageway between the inlet port and outlet port, and movable to regulate the supply of pressure fluid from the inlet port through the outlet port thereby to control the pressure fluid operated means, said passageway having opposed walls of equal area whereby the pressure sensing means is insensitive to pressure in said passageway;

d. each cavity and its pressure sensing means having confronting walls forming an expansible and contractible pressure sensing chamber to effect, upon increase of pressure therein, movement of the pressure sensing means in a direction to increase flow of fluid to the operated means, and to effect, upon decrease of pressure therein, movement of the pressure sensing means in a direction to decrease flow of fluid to the operated means;

e. means forming a restricted passageway between the outlet port and the pressure sensing chamber for effecting movement of the pressure sensing means;

f. and means for damping the movement of the pressure sensing means.

10. The combination as defined in claim 9, wherein:

a. the bearing body also includes a set of pressure sensing recesses axially spaced from the bearing recesses and communicating with the damping means.

11. The combination, as defined in claim 9, wherein:

a. each cavity is cylindrical and includes end walls;

b. the pressure sensing means is a piston reciprocable between the end walls;

c. one end wall of each cavity and the confronting end of the piston forms the pressure sensing chamber;

d. and the other end wall of each cavity confronting the other end of the piston defines a second pressure sensing chamber which forms said damping means.

12. A pressure sensing lubricant control means for bearings, comprising:

a. a bearing body structure for journalling a shaft, including a set of circumferentially spaced bearing fluid recesses confronting the shaft, a corresponding set of valve bores, each bore having an inlet, an outlet and a connection between each recess and the outlet;

b. a valve piston movable in each bore and having fluid flow passages communicating between the corresponding inlet and outlet, the flow passages having effectively equal and opposite pressure surfaces whereby the pressure of fluid flowing therein has essentially no effect on movement of the valve piston;

c. each valve piston and corresponding opposing walls defining opposed sensing and damping chambers to effect movement of the valve piston;

d. and pressure sensing control means for each bore and its piston including restricted passages communicating between both the chambers and the outlet operable to effect increase in the fluid passing through the flow passages with increased pressure at the outlet and decreased flow therethrough with decreased pressure at the outlet.

* * * * *